(12) United States Patent
Suzuki

(10) Patent No.: US 8,892,040 B2
(45) Date of Patent: Nov. 18, 2014

(54) MOBILE COMMUNICATION TERMINAL AND DATA DOWNLOAD METHOD

(75) Inventor: Toshiyuki Suzuki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 266 days.

(21) Appl. No.: 13/379,127

(22) PCT Filed: Jun. 16, 2010

(86) PCT No.: PCT/JP2010/060220
§ 371 (c)(1),
(2), (4) Date: Dec. 19, 2011

(87) PCT Pub. No.: WO2010/147152
PCT Pub. Date: Dec. 23, 2010

(65) Prior Publication Data
US 2012/0100808 A1 Apr. 26, 2012

(30) Foreign Application Priority Data
Jun. 19, 2009 (JP) .................... 2009-146753

(51) Int. Cl.
*H04B 7/00* (2006.01)
(Continued)

(52) U.S. Cl.
CPC ............ *H04M 1/7253* (2013.01); *H04W 4/008* (2013.01); *H04L 67/2861* (2013.01);
(Continued)

(58) Field of Classification Search
USPC ................................................ 455/41.1, 41.2
See application file for complete search history.

(56) References Cited

U.S. PATENT DOCUMENTS 6,687,901 B1 * 2/2004 Imamatsu ..................... 717/173
7,941,123 B2 * 5/2011 Yang et al. ................. 455/412.1
(Continued)

FOREIGN PATENT DOCUMENTS

JP 10 336272 12/1998
JP 2000 115852 4/2000
(Continued)

OTHER PUBLICATIONS

Japanese Office Action issued May 29, 2012, in Patent Application No. 2009-146753 (with English-language translation).
(Continued)

*Primary Examiner* — Edward Urban
*Assistant Examiner* — Ralph H Justus
(74) *Attorney, Agent, or Firm* — Oblon, Spivak, McClelland, Maier & Neustadt, L.L.P.

(57) ABSTRACT

The present invention aims to relay data by using two kinds of communication systems for continuous and smooth transferring of data in accordance with a connection state. A mobile communication terminal 2 includes: a mobile communication unit 121 that connects to a mobile communication network NW to download data therethrough, a short-range communication unit 122 that transmits the data downloaded to opposing equipment through short-range communication, a communication management unit 123 that detects a state of connection with the opposing equipment, a data storage unit 126 that temporarily stores the data downloaded, and a data management unit 125 that successively hands over the data temporarily stored to the short-range communication unit 122. In the case that the state of connection indicates an out-of-service-area state, the data storage unit 126 additionally stores data being downloaded by the mobile communication unit 121. In the case that the state of connection has changed from the out-of-service-area state to a normal state, the data management unit 125 hands over not-yet-transmitted data blocks stored by the data storage unit 126 to the short-range communication unit 122.

4 Claims, 4 Drawing Sheets

(51) Int. Cl.
- H04M 1/00 (2006.01)
- G06F 9/44 (2006.01)
- H04L 12/58 (2006.01)
- H04W 4/00 (2009.01)
- H04L 29/08 (2006.01)
- H04W 76/02 (2009.01)
- H04M 1/725 (2006.01)
- H04W 88/04 (2009.01)
- H04L 29/06 (2006.01)
- H04W 88/06 (2009.01)

(52) U.S. Cl.
CPC .............. *H04L 67/06* (2013.01); *H04W 88/04* (2013.01); *H04W 76/028* (2013.01); *H04L 67/2842* (2013.01); H04L 69/28 (2013.01); *H04W 88/06* (2013.01)
USPC ................... 455/41.2; 455/412.1; 455/412.5

(56) References Cited

U.S. PATENT DOCUMENTS

| | | | |
|---|---|---|---|
| 2002/0142803 A1* | 10/2002 | Yamamoto | 455/557 |
| 2004/0001474 A1* | 1/2004 | Simelius et al. | 370/349 |
| 2004/0054650 A1* | 3/2004 | Chun | 707/1 |
| 2004/0063459 A1* | 4/2004 | Yamashita et al. | 455/556.1 |

FOREIGN PATENT DOCUMENTS

| | | |
|---|---|---|
| JP | 2001 128242 | 5/2001 |
| JP | 2004-297479 | 10/2004 |
| JP | 2007 266968 | 10/2007 |
| JP | 2008 072420 | 3/2008 |
| JP | 2008 104082 | 5/2008 |
| JP | 2008-306432 | 12/2008 |
| JP | 2010 011365 | 1/2010 |
| WO | WO 2008/099716 A1 | 8/2008 |

OTHER PUBLICATIONS

International Preliminary Report on Patentability and Written Opinion issued Jan. 26, 2012 in patent application No. PCT/JP2010/060220 filed Jun. 16, 2010.

International Search Report Issued Aug. 3, 2010 in PCT/JP10/060220 Filed Jun. 16, 2010.

Combined Office Action and Search Report issued Jan. 6, 2014 in Chinese Patent Application No. 201080023347.8 with English language translation.

Supplementary European Search Report issued on Jul. 24, 2014 in European Application No. EP 10 78 9526.

* cited by examiner

MOBILE COMMUNICATION TERMINAL AND DATA DOWNLOAD METHOD

TECHNICAL FIELD

The present invention relates to a mobile communication terminal and a data download method for downloading data through cooperation between mobile communication and short-range communication.

BACKGROUND ART

A client-server system which performs data transmission/reception between a server and a client through a communication line is conventionally known (for example, see Patent Literature 1 below). In such a client-server system, when a communication line is disconnected during data communication and is thereafter restored, data temporarily held by the server is retrieved after the line restoration and is retransmitted to the client. This allows communication between applications to be automatically resumed after the recovery from disconnection.

On the other hand, in recent years, mobile communication terminals such as mobile phones have been equipped with the short-range communication function such as infrared communication, Bluetooth communication, and non-contact IC card communication. In such mobile communication terminals, data downloaded from a mobile communication network is transferred to, for example, a personal computer through short-range communication.

CITATION LIST

Patent Literature

Patent Literature 1: Japanese Patent Application Laid-Open Publication No. 10-336272

SUMMARY OF INVENTION

Technical Problem

However, the short-range communication function as described above has a limited range in which communication can be established with opposing equipment, and communication disconnection tends to occur depending on the use situation of mobile communication terminals. For example, when an incoming call is received during data communication via short-range communication, disconnection of the short-range communication may be caused by picking up the mobile communication terminal. Therefore, with the conventional data retransmission method, when data is downloaded using two kinds of communication systems, it is difficult to transfer data in real time without involvement of an application program or user operation.

The present invention is therefore made in light of the foregoing problem and aims to provide a mobile communication terminal and a data download method in which when data is relayed using two kinds of communication systems, data can be transferred continuously and smoothly in accordance with a connection state.

Solution to Problem

In order to solve the aforementioned problem, a mobile communication terminal in the present invention includes mobile communication means for connecting to a mobile communication network to download data therethrough, short-range communication means for transmitting the data downloaded by the mobile communication means to opposing equipment through short-range communication, communication management means for detecting a state of connection with the opposing equipment by the short-range communication means, data storage means for temporarily storing the data downloaded by the mobile communication means, and data management means for successively handing over the data temporarily stored by the data storage means to the short-range communication means. In the case that the state of connection detected by the communication management means indicates a disconnected state, the data storage means additionally stores data being downloaded by the mobile communication means. In the case that the state of connection detected by the communication management means has changed from the disconnected state to a normal state, the data management means hands over a portion that has not yet been transmitted of the data stored by the data storage means, to the short-range communication means.

Alternatively, a data download method in the present invention includes a mobile communication step of, by mobile communication means, connecting to a mobile communication network to download data therethrough, a short-range communication step of, by short-range communication means, transmitting the data downloaded by the mobile communication means to opposing equipment through short-range communication, a communication management step of, by communication management means, detecting a state of connection with the opposing equipment by the short-range communication means, a data storage step of, by data storage means, temporarily storing the data downloaded by the mobile communication means, and a data management step of, by data management means, successively handing over the data temporarily stored by the data storage means to the short-range communication means. In the data storage step, in the case that the state of connection detected by the communication management means indicates a disconnected state, data being downloaded by the mobile communication means is additionally stored. In the data management step, in the case that the state of connection detected by the communication management means has changed from the disconnected state to a normal state, a portion that has not yet been transmitted of the data stored by the data storage means is handed over to the short-range communication means.

In such mobile communication terminal and data download method, data is downloaded by the mobile communication means, and the data is transmitted to opposing equipment by the short-range communication means. The state of connection by the short-range communication means is detected by the communication management means. The downloaded data is temporarily stored by the data storage means. The temporarily stored data is handed over to the short-range communication means by the data management means. Here, even in the case that the connection state of the short-range communication means is the disconnected state, data that is being downloaded is additionally stored in the data storage means. Thereafter, in the case that the disconnected state changes to the normal state, a portion that has not yet been transmitted of the data stored in the data storage means is handed over to the short-range communication means and transmitted to the opposing equipment. Accordingly, even in the case that the short-range communication means is temporarily disconnected, download data can be transferred to the opposing equipment without loss or redundancy. As a result, when data is relayed using two kinds of communication systems, namely, a mobile communication system and a short-range communication system, data can be downloaded smoothly in accordance with a connection state of the short-range communication system.

Advantageous Effects of Invention

According to the present invention, when data is relayed using two kinds of communication systems, data can be transferred continuously and smoothly in accordance with a connection state.

DESCRIPTION OF EMBODIMENTS

Figure 1:
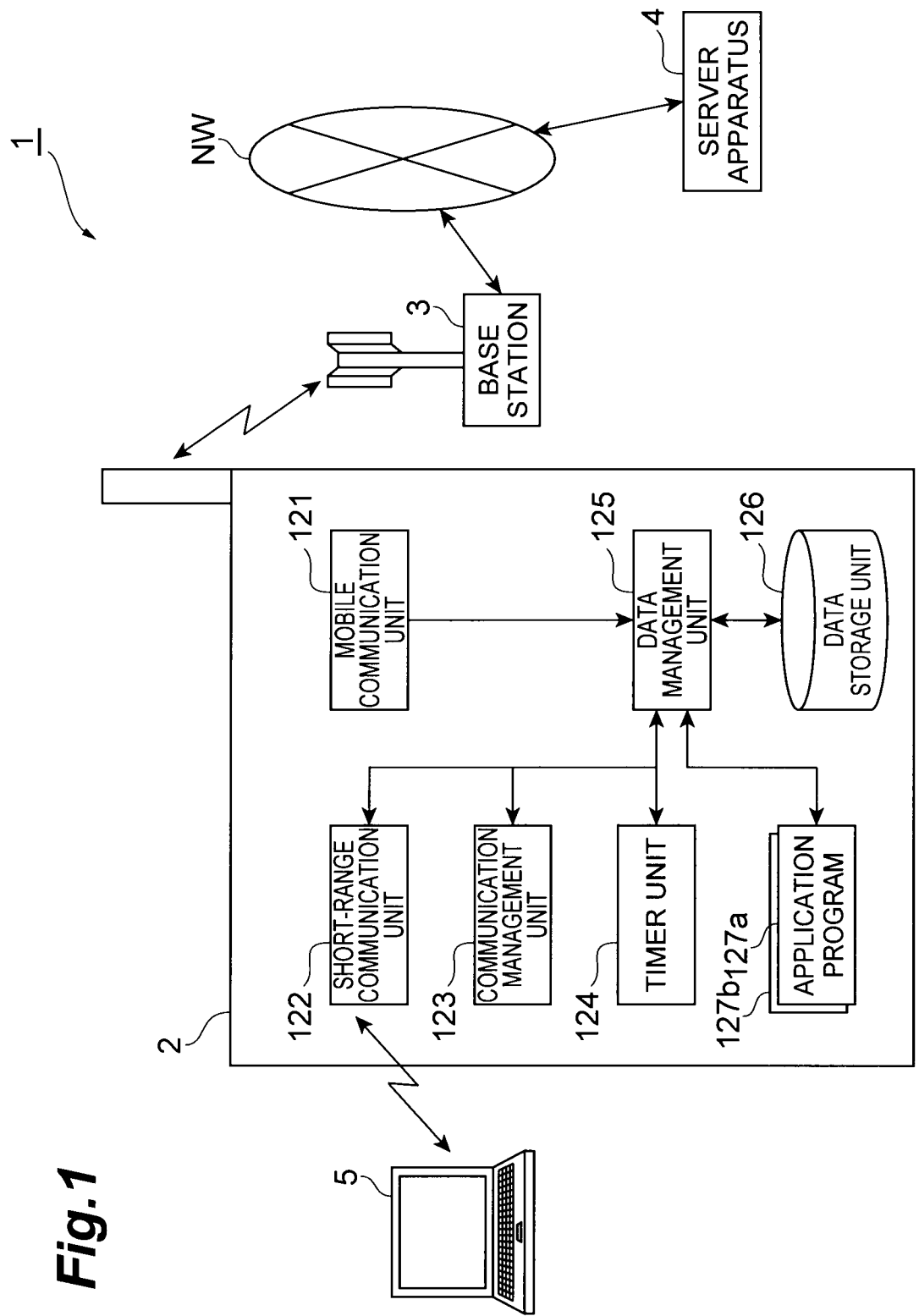
FIG. 1 is a connection configuration diagram showing a data download system as a suitable embodiment of the present invention.

In the following, a suitable embodiment of a mobile communication terminal and a data download method according to the present invention will be described in detail in conjunction with the figures. It is noted that in the description of the drawings, the same components are denoted with the same reference numerals, and a duplicated description will be omitted.

FIG. 1 is a connection configuration diagram showing a data download system 1 as a suitable embodiment of the present invention. The data download system 1 shown in the figure is a client-server system for downloading a variety of data such as text data, audio data, image data or program codes from a server apparatus 4 connected to a mobile communication network NW to a personal computer (opposing equipment) 5 via a mobile communication terminal 2. It is noted that the mobile communication terminal 2 and the server apparatus 4 are connected such that data can be communicated with each other through the mobile communication network NW which employs a mobile communication system such as W-CDMA (Wideband Code Division Multiple Access) or CDMA 2000. The mobile communication terminal 2 and the personal computer 5 are connected such that data can be communicated with each other by a short-range communication system such as infrared communication, Bluetooth communication, or non-contact IC card communication. Mobile communication terminal 2 is a terminal device represented by a mobile phone, a PDA (Personal Digital Assistance), or the like, and is wirelessly connected to a base station 3 to transmit/receive data to/from the mobile communication network NW.

A configuration of the mobile communication terminal 2 will now be described in detail.

Figure 2:
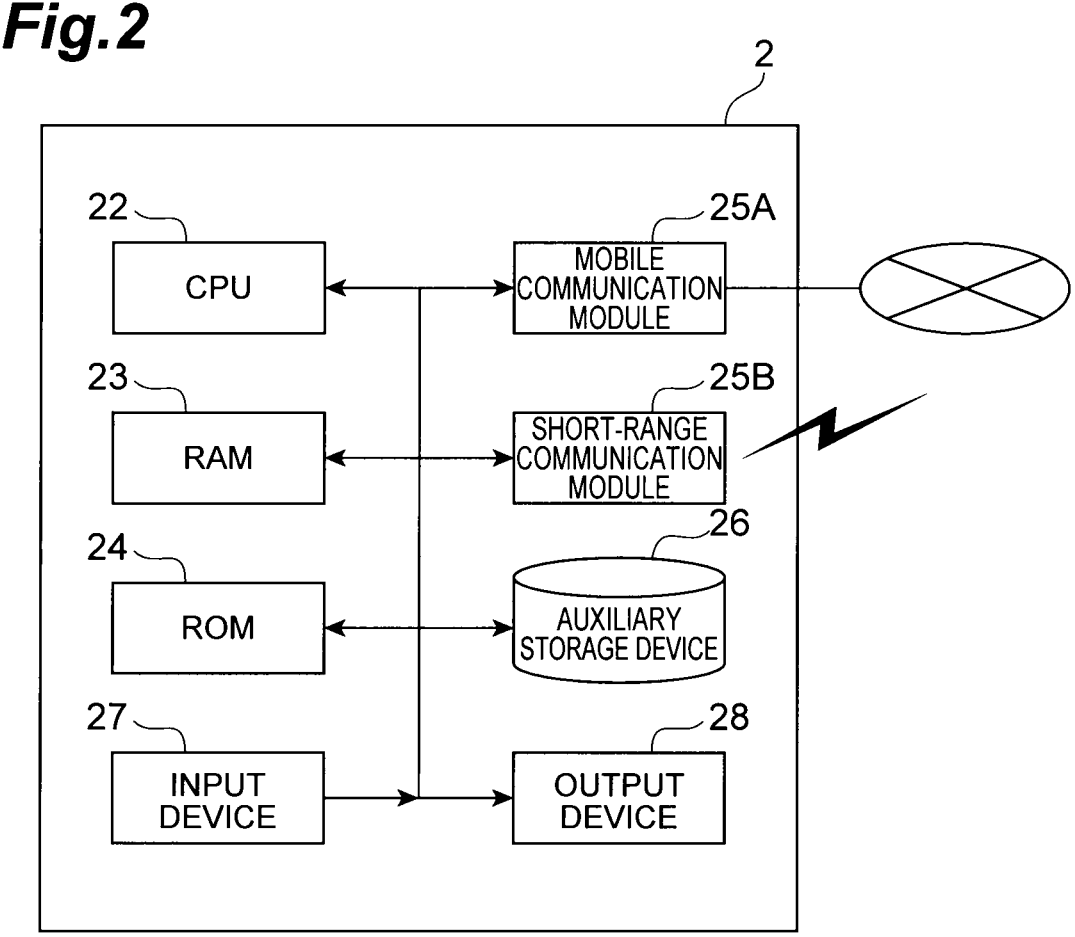
FIG. 2 is a block diagram showing a hardware configuration of a mobile communication terminal in FIG. 1.

As shown in FIG. 2, physically, the mobile communication terminal 2 is configured as an information processing apparatus mainly including a CPU 22, a RAM 23 and a ROM 24 serving as main storage devices, an auxiliary storage device 26 such as a hard disk device, an input device 27 such as input keys and a mouse serving as an input device, an output device 28 such as a display, a mobile communication module 25A controlling data transmission/reception to/from the mobile communication network NW, and a short-range communication module 25B controlling data transmission/reception by a short-range communication system. The functions implemented by the mobile communication terminal 2 are implemented by reading a predetermined program on the hardware such as the CPU 22 and the RAM 23 shown in FIG. 2 to operate the mobile communication module 25A, the short-range communication module 25B, the input device 27, and the output device 28 under the control of the CPU 22, and by performing data read and data write in RAM 23 or the auxiliary storage device 26.

As shown in FIG. 1, the mobile communication terminal 2 includes, as functional components, a mobile communication unit (mobile communication means) 121, a short-range communication unit (short-range communication means) 122, a communication management unit (communication management means) 123, a timer unit (timer means) 124, a data management unit (data management means) 125, a data storage unit (data storage means) 126, and application programs (an application function unit) 127a and 127b.

The application programs 127a and 127b are programs operating in connection with data downloaded from the server apparatus 4, and are, for example, programs for data communication such as Web browsers and file exchange programs. A download process for data from the server apparatus 4 is initiated by the functions of the application programs 127a and 127b, and the data is successively transferred to the personal computer 5.

The mobile communication unit 121 transmits/receives data to/from the server apparatus 4 by connecting to the mobile communication network NW through the base station 3 using a mobile communication system. More specifically, the mobile communication unit 121 has a mobile communication function of a lower layer of a communication protocol and downloads data from the server apparatus 4 in cooperation with the application programs 127a and 127b having a communication function of an upper layer.

The short-range communication unit 122 transmits/receives data to/from the personal computer 5 by connecting to the personal computer 5 using a short-range communication system such as infrared communication, Bluetooth communication, or non-contact IC card communication. Specifically, the short-range communication unit 122 has a short-range communication function of a lower layer and transmits data to the personal computer 5 in cooperation with the application programs 127a and 127b. Here, when the short-range communication unit 122 is used to connect to the personal computer 5, the mobile communication terminal 2 is placed in proximity to the personal computer 5 by the user since the communication area is limited to the proximity of the personal computer 5.

The communication management unit 123 detects a state of connection with the personal computer 5 by the short-range communication unit 122. Specifically, the communication management unit 123 detects, for example, time-out of the connection with the personal computer 5, the out-of-service-area state in which no signal is detected from the personal computer 5, and reduction in data transfer speed (throughput) to/from the personal computer 5. Then, the communication management unit 123 outputs information indicating the detected connection state ("normal state" or "out-of-service-area state") to the timer unit 124 and the data management unit 125. The connection state "out-of-service-area state" means that the connection with the personal computer 5 is in a disconnected state, for example, because a distance from the personal computer 5 increases or an obstruction is present on the way to the personal computer 5, and "normal state" means that the connection with the personal computer 5 is kept normal and the throughput is also secured.

The timer unit 124 measures the elapsed time since the communication management unit 123 detected that the connection state of short-range communication is "out-of-service-area state," and continuously outputs the obtained elapsed time $T_0$ to the data management unit 125.

The data management unit 125 receives the data downloaded by the mobile communication unit 121 each time, hands over the data to the short-range communication unit 122 in real time, and controls such that the short-range communication unit 122 automatically transfers the data to the personal computer 5. At that time, the data management unit 125 performs control such that the download data is temporarily stored in the data storage unit 126 and the data that has been transferred by the short-range communication unit 122 is deleted from the data storage unit 126 each time. In other words, the data management unit 125 monitors a data block (portion) that has been transferred by the short-range communication unit 122 and deletes the data block from the data storage unit 126 as needed.

When the connection state of short-range communication that is passed from the communication management unit 123 changes to "out-of-service-area state," the data management unit 125 continues data downloading by the mobile communication unit 121 and stores the download data into the data storage unit 126 in addition to data blocks that have not yet been transmitted to the personal computer 5. Furthermore, in the case that the connection state of short-range communication has changed from "out-of-service-area state" to "normal state", the data management unit 125 reads out the not-yet-transmitted data blocks from the data storage unit 126 and thereafter hands over these data blocks to the short-range communication unit 122 to transfer them to the personal computer 5. Then, the data management unit 125 hands over data newly downloaded by the mobile communication unit 121 to the short-range communication unit 122 after the transfer of all the not-yet-transmitted data blocks is completed while the data blocks that have been transferred are deleted from the data storage unit 126 as needed. Here, the mobile communication unit 121 does not redundantly download a data block that has already been downloaded and has been stored in the data storage unit 126, but if such a data block has been downloaded redundantly, it is discarded by the data management unit 125.

When the duration time $T_0$ of "out-of-service-area state" provided from the timer unit 124 is equal to or greater than a preset threshold $T_{th}$, the data management unit 125 deletes all the not-yet-transmitted data blocks downloaded by the mobile communication unit 121 and temporarily stored in the data storage unit 126 and stops data download by the mobile communication unit 121. As a result, when the short-range communication is restored, data that is in process of data transfer to the personal computer 5 is downloaded again from the beginning from the mobile communication network NW. When the duration time $T_0$ is equal to or greater than the threshold $T_{th}$, the data management unit 125 notifies the application programs 127a and 127b in operation in connection with the download data, that the short-range communication is in "out-of-service-area state." Conversely, when the duration time $T_0$ is less than the threshold $T_{th}$, the data management unit 125 detects the out-of-service-area state only by the short-range communication unit 122 corresponding to a lower layer of a short-range communication protocol, and does not notify the application programs 127a and 127b corresponding to an upper layer. Accordingly, the application programs 127a and 127b can detect a communication failure and initiate the corresponding recovery process such as a data retransmission process. On the other hand, when recovery from a communication failure is completed in a short time, the data download process can automatically continue smoothly without involvement of the application programs 127a and 127b.

Figure 3:
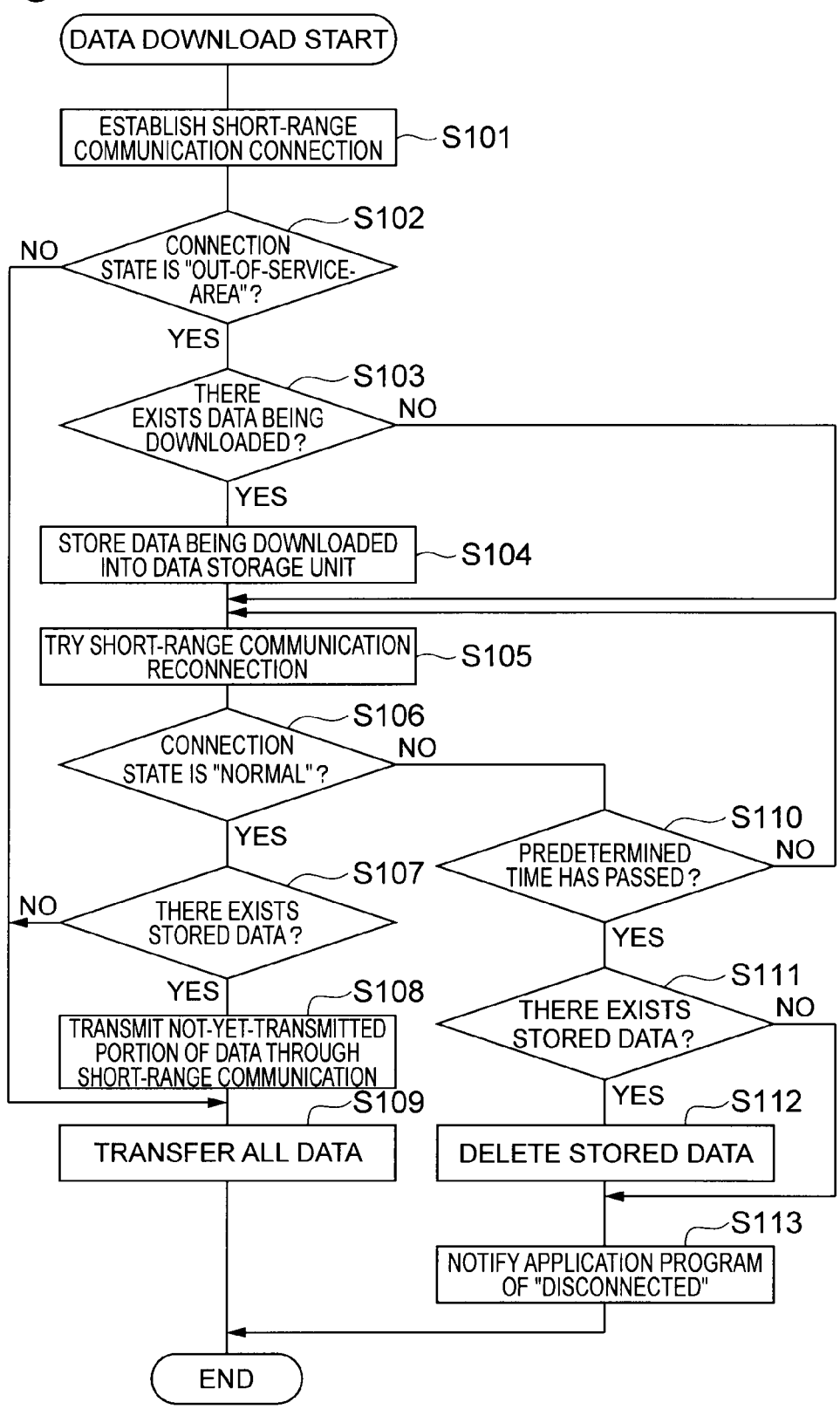
FIG. 3 is a flowchart showing an operation of the mobile communication terminal in FIG. 1 during data download.

In the following, referring to FIG. 3, an operation of the mobile communication terminal 2 during the data download process will be described, and in addition, a data download method in the mobile communication terminal 2 will be detailed. FIG. 3 is a flowchart showing the operation of the mobile communication terminal 2 during data download.

First, when a data download process from the server apparatus 4 is initiated by the application programs 127a and 127b operating in the mobile communication terminal 2, reception of data through the mobile communication network NW is started, and at the same time, connection of short-range communication with the personal computer 5 is established, whereby the downloaded data is automatically transferred to the personal computer 5 (step S101). Thereafter, it is periodically determined by the data management unit 125 whether the connection state of short-range communication is "out-of-service-area state" (step S102). If the connection state is not "out-of-service-area state" but "normal state" as a result of the determination (step S102; NO), the process proceeds to step S109, and all the data to be downloaded is successively transferred (step S109).

On the other hand, if the connection state is "out-of-service-area state" (step S102; YES), it is further determined by the data management unit 125 whether there exists data that is being downloaded from the server apparatus 4 (step S103). As a result, if there exists data that is being downloaded (step S103; YES), the downloaded data block is added to the data blocks that have not yet been transmitted to the personal computer 5, and stored in the data storage unit 126 (step S104). Concurrently, reconnection to the personal computer 5 is periodically tried by the short-range communication unit 122 (step S105). On the other hand, if there exists no data that is being downloaded (step S103; NO), only reconnection to the personal computer 5 is tried (step S105).

Next, it is determined by the data management unit 125 whether the connection state of short-range communication changes to "normal state" (step S106). If the connection state changes to "normal state" as a result of the determination (step S106; YES), it is further determined whether there exists a not-yet-transmitted data block that has been stored in the data storage unit 126 (step S107). Then, if there exists a not-yet-transmitted data block (step S107; YES), that data block is first transferred to the personal computer 5 through short-range communication (step S108), and thereafter, the remaining data blocks downloaded using wireless communication are transferred (step S109). On the other hand, if a not-yet-transmitted data block does not exist (step S107; NO), data downloaded later using wireless communication is transferred to personal computer 5 (step S109).

If the connection state of short-range communication remains "out-of-service-area state" in step S106 (step S106; NO), it is determined whether the duration time $T_0$ of "out-of-service-area state" has passed a time period equal to or longer than the preset threshold $T_{th}$ (step S110). As a result, if the duration time $T_0$ has not passed the threshold $T_{th}$ (step S110; NO), the process proceeds to step S105, and reconnection to the personal computer 5 is tried (step S105).

On the other hand, if the duration time $T_0$ has passed the threshold $T_{th}$ (step S110; YES), it is determined whether there exist not-yet-transmitted data blocks stored in the data storage unit 126 (step S111). Then, if there exist not-yet-transmitted data blocks (step S111, YES), these data blocks are deleted from the data storage unit 126 by the data management unit 125 (step S112). Thereafter, the data management unit 125 notifies the application programs 127a and 127b that the connection state with the personal computer 5 is "disconnected state" (step S113). The data download process then ends.

Figure 4:
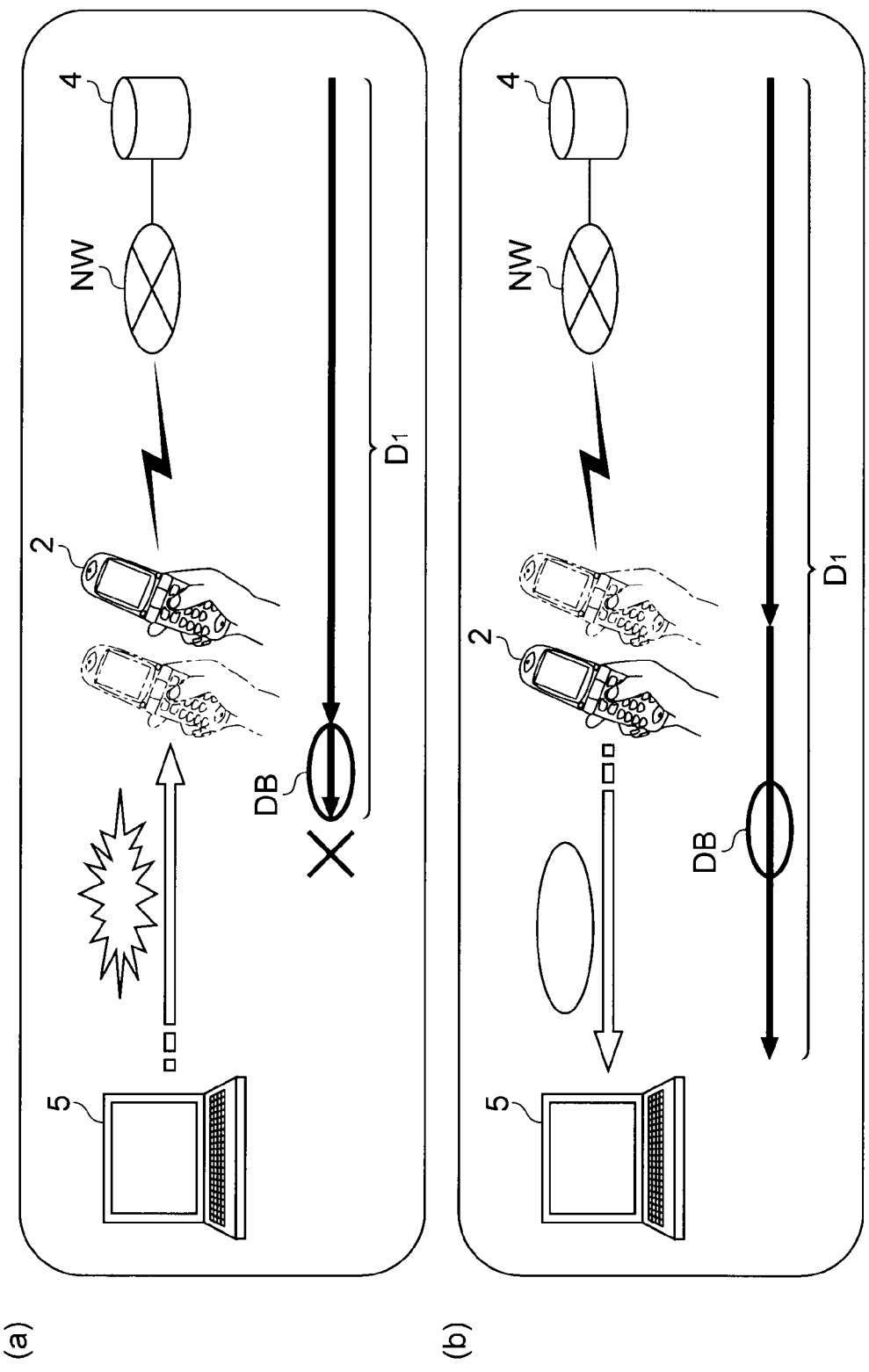
FIG. 4 is a conceptual diagram of a data download process in the mobile communication terminal in FIG. 1.

FIG. 4 is a conceptual diagram of the data download process in the mobile communication terminal 2. In the figure, it is assumed that data is downloaded from the server apparatus 4 connected to the mobile communication network NW to the personal computer 5 using the mobile communication terminal 2. Here, if the mobile communication terminal 2 receives an incoming call and the mobile communication terminal 2 is moved away from the personal computer 5 by the user, the connection between the mobile communication terminal 2 and the personal computer 5 is cut off before the transfer of data $D_1$ that is being downloaded is completed (FIG. 4(a)). Thereafter, a not-yet-transferred data block DB of the data $D_1$ received from the mobile communication network NW is temporarily stored in the mobile communication terminal 2 until the connection with the personal computer 5 is restored.

Then, when the mobile communication terminal 2 is put to the previous position, and the short-range communication between the mobile communication terminal 2 and the personal computer 5 recovers from the disconnected state, the not-yet-transferred data block DB that is temporarily stored is successively transferred to the personal computer 5 (FIG. 4(b)). Then, the remaining data blocks received from the mobile communication network NW of the data $D_1$ to be downloaded are transferred to the personal computer 5.

In the mobile communication terminal 2 and the data download method as described above, data is downloaded from the server apparatus 4 by the mobile communication unit 121 and is transmitted to opposing equipment such as the personal computer 5 by the short-range communication unit 122. The state of connection by the short-range communication unit 122 is detected by the communication management unit 123. The downloaded data is temporarily stored by the data storage unit 126. The temporarily stored data is handed over to the short-range communication unit 122 by the data management unit 125. Here, even when the connection state of the short-range communication unit 122 is "out-of-service-area state," a data block that is being downloaded is additionally stored in the data storage unit 126, and thereafter when "out-of-service area state" changes to "normal state," the not-yet-transmitted data block that is stored in the data storage unit 126 is handed over to the short-range communication unit 122 and then transmitted to the opposing equipment. Accordingly, even when the short-range communication is temporarily disconnected, the download data can be transferred to the opposing equipment without loss or redundancy. As a result, when data is relayed using two kinds of communication systems, namely, a mobile communication system and a short-range communication system, data can be downloaded smoothly in accordance with a connection state of the short-range communication system.

When the short-range communication is disconnected for a certain time period or longer, the temporarily held data is deleted from the data storage unit 126, so that the data is downloaded again thereby ensuring the identity of data and keeping the reliability of data. Furthermore, when the short-range communication is disconnected for a certain time period or longer, a predetermined operation of an application program is enabled, thereby realizing a smooth recovery process such as data retransmission at a communication failure.

It is noted that the present invention is not limited to the foregoing embodiment. For example, the equipment from which data is downloaded is not limited to any particular kind of equipment as long as it is communication equipment that can connect to the mobile communication network NW, and may be a communication terminal such as a mobile phone or personal computer. The equipment to which data is downloaded may be various kinds of equipment such as a mobile phone, PDA, or server apparatus as long as it can perform short-range communication.

It is preferable that timer means be further provided for measuring a time period for which the connection state detected by the communication management means indicates the disconnected state, and the data storage means delete the data downloaded by mobile communication means and temporarily stored in the case that the time period measured by the timer means is equal to or longer than a threshold.

In this case, when the short-range communication means is disconnected for a certain time period or longer, the temporarily held data is deleted, so that the data is downloaded again, thereby keeping the reliability of data.

In the case that the time period measured by the timer means is equal to or longer than the threshold, the data management means preferably gives notification of the disconnected state to the application function unit operating in connection with the data.

In this manner, in the case that the short-range communication means is disconnected for a certain time period or longer, a predetermined operation by the application function unit is enabled, thereby realizing a smooth recovery process such as data retransmission at a communication failure.

Industrial Applicability

The present invention is used for a mobile communication terminal and a data download method and allows data to be transferred continuously and smoothly in accordance with a connection state when data is relayed using two kinds of communication systems.

Reference Signs List

2 . . . mobile communication terminal, 5 . . . personal computer (opposing equipment), 121 . . . mobile communication unit (mobile communication means), 122 . . . short-range communication unit (short-range communication means), 123 . . . communication management unit (communication management means), 124 . . . timer unit (timer means), 125 . . . data management unit (data management means), 126 . . . data storage unit (data storage means), 127a, 127b . . . application programs (application function unit), NW . . . mobile communication network.

The invention claimed is:

1. A mobile communication terminal comprising:
  mobile communication means for connecting to a mobile communication network to download data therethrough;
  short-range communication means for transmitting the data downloaded by the mobile communication means to opposing equipment through short-range communication;
  communication management means for detecting a state of connection with the opposing equipment by the short-range communication means;
  data storage means for temporarily storing the data downloaded by the mobile communication means;
  data management means for successively handing over the data temporarily stored by the data storage means to the short-range communication means; and
  timer means for measuring a time period for which the state of connection detected by the communication management means indicates a disconnected state, wherein in the case that the state of connection detected by the communication management means indicates a disconnected state, the data storage means additionally stores data being downloaded by the mobile communication means, in the case that the state of connection detected by the communication management means has changed from the disconnected state to a normal state, the data management means deletes data that has been transferred by the short-range communication means from the data storage means as needed while handing over a portion that has not yet been transmitted of the data stored by the data storage means, to the short-range communication means, in the case that the time period measured by the timer means is equal to or longer than a threshold, the data storage means deletes the data downloaded by the mobile communication means and temporarily stored, and in the case that the time period measured by the timer means is shorter than the threshold, the data management means does not give notification of the disconnected state to an application function unit operating in connection with the data.

2. The mobile communication terminal according to claim 1, wherein in the case that the time period measured by the timer means is equal to or longer than the threshold, the data management means gives notification of the disconnected state to the application function unit operating in connection with the data.

3. A data download method comprising:

a mobile communication step of, by mobile communication means, connecting to a mobile communication network to download data therethrough;

a short-range communication step of, by short-range communication means, transmitting the data downloaded by the mobile communication means to opposing equipment through short-range communication;

a communication management step of, by communication management means, detecting a state of connection with the opposing equipment by the short-range communication means;

a data storage step of, by data storage means, temporarily storing the data downloaded by the mobile communication means;

a data management step of, by data management means, successively handing over the data temporarily stored by the data storage means to the short-range communication means; and a measurement step of, by timer means, measuring a time period for which the state of connection detected by the communication management means indicates a disconnected state, wherein in the data storage step, in the case that the state of connection detected by the communication management means indicates a disconnected state, data being downloaded by the mobile communication means is additionally stored, in the data management step, in the case that the state of connection detected by the communication management means has changed from the disconnected state to a normal state, the data management means deletes data that has been transferred by the short-range communication means from the data storage means as needed while handing over a portion that has not yet been transmitted of the data stored by the data storage means to the short-range communication means, in the case that the time period measured by the timer means is equal to or longer than a threshold, the data storage means deletes the data downloaded by the mobile communication means and temporarily stored, and in the case that the time period measured by the timer means is shorter than the threshold, the data management means does not give notification of the disconnected state to an application function unit operating in connection with the data.

4. A mobile communication terminal comprising:

circuitry configured to:

cause a mobile communicator to connect to a mobile communication network to download data therethrough;

cause a short-range communicator to transmit the data downloaded by the mobile communicator to opposing equipment through short-range communication;

detect a state of connection with the opposing equipment by the short-range communicator;

cause a data storage device to temporarily store the data downloaded by the mobile communicator, successively hand over the data temporarily stored by the data storage device to the short-range communicator, and measure a time period for which the detected state of connection indicates a disconnected state, wherein in the case that the detected state of connection indicates a disconnected state, the data storage device additionally stores data being downloaded by the mobile communicator, in the case that the detected state of connection has changed from the disconnected state to a normal state, the circuitry deletes data that has been transferred by the short-range communicator from the data storage device as needed while handing over a portion that has not yet been transmitted of the data stored by the data storage device, to the short-range communicator, in the case that the measured time period is equal to or longer than a threshold, the data storage device deletes the data downloaded by the mobile communicator and temporarily stored, and in the case that the measured time period is shorter than the threshold, the circuitry does not give notification of the disconnected state to an application function unit operating in connection with the data.

* * * * *